(12) United States Patent
Zhou et al.

(10) Patent No.: US 10,352,687 B2
(45) Date of Patent: Jul. 16, 2019

(54) ONLINE THICKNESS DETECTION PLATFORM

(71) Applicants: Tyco Electronics (Shanghai) Co. Ltd., Shanghai (CN); TE Connectivity Corporation, Berwyn, PA (US); Shenzhen AMI Technology Co. Ltd., Shenzhen (CN)

(72) Inventors: Lei Zhou, Shanghai (CN); Dandan Zhang, Shanghai (CN); Roberto Francisco-Yi Lu, Shanghai (CN); Qinglong Zeng, Shanghai (CN)

(73) Assignees: Tyco Electronics (Shanghai) Co. Ltd., Shanghai (CN); TE Connectivity Corporation, Berwyn, PA (US); Shenzhen AMI Technology Co., Ltd., Shenzhen (CN)

(*) Notice: Subject to any disclaimer, the term of this patent is extended or adjusted under 35 U.S.C. 154(b) by 0 days.

(21) Appl. No.: 15/798,513

(22) Filed: Oct. 31, 2017

(65) Prior Publication Data

US 2018/0120095 A1 May 3, 2018

(30) Foreign Application Priority Data

Oct. 31, 2016 (CN) .......................... 2016 1 0971013

(51) Int. Cl.
*G01B 11/06* (2006.01)

(52) U.S. Cl.
CPC ...... *G01B 11/0691* (2013.01); *G01B 2210/44* (2013.01)

(58) Field of Classification Search
CPC ............... G01N 1/2813; G01N 1/4077; G01N 2001/1025; G01N 2001/2826;
(Continued)

(56) References Cited

U.S. PATENT DOCUMENTS 3,822,383 A 7/1974 Beckage et al.
5,253,039 A * 10/1993 Fujimoto ............. G01B 11/024
356/606

(Continued)

FOREIGN PATENT DOCUMENTS

CN 201364149 Y 12/2009
DE 202015106767 U1 1/2016
(Continued)

OTHER PUBLICATIONS

European Search Report, dated Dec. 20, 2017, 7 pages.

*Primary Examiner* — Michael P Stafira
(74) *Attorney, Agent, or Firm* — Barley Snyder

(57) ABSTRACT

An online thickness detection platform having a first laser sensor and a second laser sensor that detect a thickness of a product passing between the first arm and the second arm of a C-type frame on which the first laser sensor and a second laser sensor, respectively are adjustably mounted. The first laser sensor and the second laser sensor do not contact the product during detecting the thickness of the product. Because the thickness of the product is detected online, the thickness of the product is monitored in real-time. When the thickness of the product exceeds or falls below an allowed value range, production of the product is stopped, thereby avoiding producing a large number of unqualified products with a thickness out of the allowed value range and waste is prevented.

13 Claims, 3 Drawing Sheets

(58) Field of Classification Search
CPC .......... G01N 2035/00089; G01N 2035/00138;
G01N 2035/0405; G01N 2035/0427;
G01N 2035/0441; G01N 2035/0443;
G01N 2035/0458; G01N 2035/0462;
G01N 27/22; G01N 35/00; G01N
35/00029; G01N 35/0099; G01N 35/021;
G01N 35/04; G01N 35/1016; G01N
2223/204; G01N 2223/611; G01N
23/2251; G02B 26/0858; G02B 26/105
See application file for complete search history.

(56) References Cited

U.S. PATENT DOCUMENTS

| | | | | |
|---|---|---|---|---|
| 5,661,250 A | * | 8/1997 | Katahira | G01B 11/0616 356/630 |
| 6,100,986 A | * | 8/2000 | Rydningen | G01B 11/022 250/559.25 |
| 6,281,679 B1 | * | 8/2001 | King | G01B 7/107 324/226 |
| 6,429,944 B1 | * | 8/2002 | Flormann | G01B 15/025 356/238.2 |
| 6,441,905 B1 | * | 8/2002 | Tojyo | G01B 21/045 356/429 |
| 7,310,148 B2 | * | 12/2007 | Dircksen | G01B 11/06 356/429 |
| 2011/0279828 A1 | * | 11/2011 | Matsumoto | F22B 37/005 356/630 |
| 2014/0268183 A1 | * | 9/2014 | Furuta | G01B 5/0011 356/630 |

FOREIGN PATENT DOCUMENTS

| | | |
|---|---|---|
| EP | 0452666 A1 | 10/1991 |
| JP | 2002131044 A | 5/2002 |

* cited by examiner

ONLINE THICKNESS DETECTION PLATFORM

CROSS-REFERENCE TO RELATED APPLICATION

This application claims the benefit of the filing date under 35 U.S.C. § 119(a)-(d) of Chinese Patent Application No. 2016109710132 filed on Oct. 31, 2016.

FIELD OF THE INVENTION

The present invention relates, in general, monitoring products while still being produced and, in particular, to detecting the thickness of products while still being produced.

BACKGROUND

In the prior art, it is often required to detect a thickness of a multilayer stacked plate in high accuracy. For example, the multilayer stacked plate may comprise a PTC (Positive Temperature Coefficient) material layer and two metal layers covered on both sides of the PTC material layer, respectively. Because the electrical and thermal properties of the multilayer stacked plate are closely related to its thickness, the thickness of the multilayer stacked plate must be detected in high accuracy. In order to detect the thickness of multilayer stacked plate with high accuracy, in the prior art, offline detection is usually used. In this case, before detecting, it is necessary to produce a multilayer stacked plate with sufficient length, and then to accurately detect the thickness of the multilayer stacked plate in an offline manner in the laboratory. If the difference between the thickness of the detected multilayer stacked plate and the preset thickness is larger than a preset value, it would have to discard the length of multilayer stacked plate, which will lead to considerable waste.

SUMMARY

An online thickness detection platform, constructed in accordance with the present invention, includes a main frame having a first beam and a second beam that extend in a first horizontal direction and are opposite to each other in a vertical direction perpendicular to the first horizontal direction. This online thickness detection platform also includes a C-type frame slidably mounted on the main frame and having a first arm and a second arm: that extend in the first horizontal direction and are opposite to each other in the vertical direction. This online thickness detection platform further includes a first laser sensor and a second laser sensor mounted on the first arm and the second arm of the C-type frame, respectively, and detect a thickness of a product passing between the first arm and the second arm of the C-type frame. The first laser sensor and a second laser sensor move in a second horizontal direction perpendicular to the first horizontal direction and are spaced apart and do not contact the product during detecting the thickness of the product. An online thickness detection platform, constructed in accordance with the present invention, also includes a driving mechanism mounted on the main frame to drive the C-type frame to slide back and forth in the first horizontal direction.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENT(S)

Figure 1:
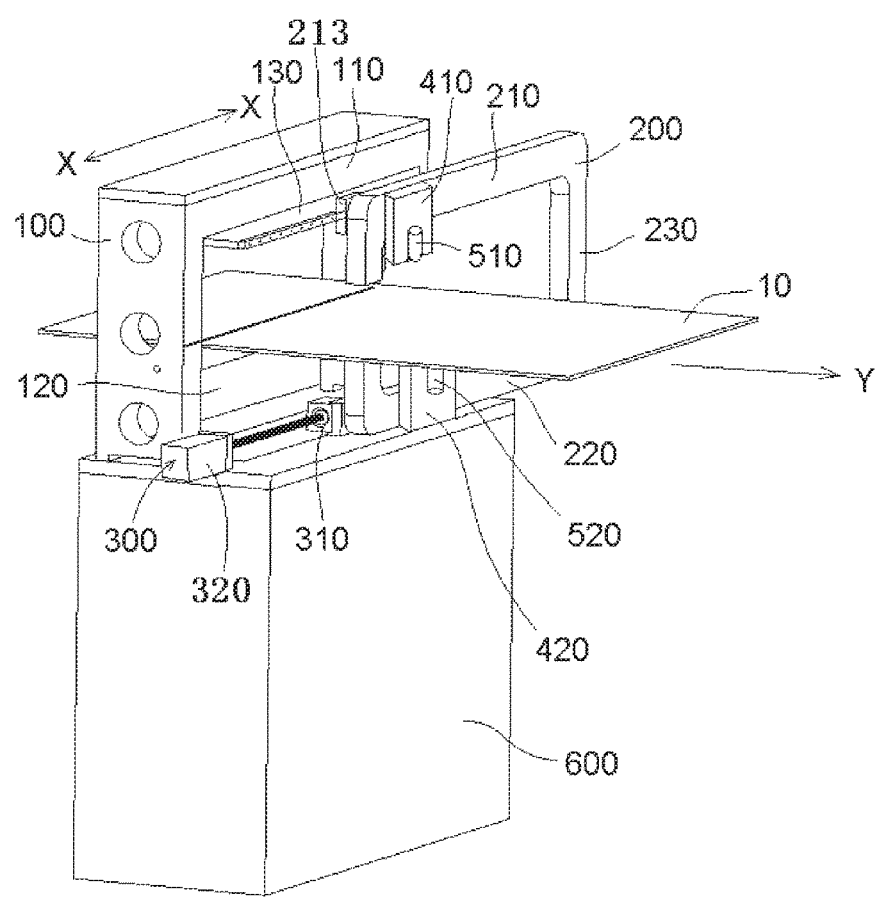
FIG. 1 is a perspective view of an online thickness detection platform according to an exemplary embodiment of the present disclosure.

Exemplary embodiments of the present disclosure will be described hereinafter in detail with reference to drawings, wherein the like reference numerals refer to the like elements. The present disclosure may, however, be embodied in many different forms and should not be construed as being limited to the embodiments set forth herein; rather, these embodiments are provided so that the present disclosure will be thorough and complete and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a perspective view of an online thickness detection platform according to an exemplary embodiment of the present invention.

As shown in FIG. 1, in an embodiment of the present invention, the online thickness detection platform mainly comprises a main frame 100, a C-type frame 200, a first laser sensor 510, a second laser sensor 520, and a driving mechanism 300. The main frame 100 has a first beam 110 and a second beam 120 extending in a first horizontal direction X and opposite to each other in a vertical direction perpendicular to the first horizontal direction X. The C-type frame 200 is slidably mounted on the main frame 100 and has a first arm 210 and a second arm 220 extending in the first horizontal direction X and opposite to each other in the vertical direction. The first laser sensor 510 and the second laser sensor 520 are mounted on the first arm 210 and the second arm 220 of the C-type frame 200, respectively. The driving mechanism 300 is mounted on the main frame 100 and adapted to drive the C-type frame 200 to slide back and forth in the first horizontal direction X.

As shown in FIG. 1, in an embodiment of the present invention, the product 10 to be detected is adapted to move in a second horizontal direction Y perpendicular to the first horizontal direction X and passes between the first arm 210 and the second arm 220 and between the first beam 110 and the second beam 120. The first laser sensor 510 and the second laser sensor 520 detect the thickness of the product 10 passing between the first arm 210 and the second arm 220 without contacting the product 10. That is, the first laser sensor 510 and the second laser sensor 520 do not contact the product 10 during detecting the thickness of the product 10.

As shown in FIG. 1, in an embodiment of the present invention, the first arm 210 of the C-type frame 200 is slidably mounted on the first beam 110 of the main frame 100. The driving mechanism 300 drives the second arm 220 of the C-type frame 200, so that the first arm 210 and the second arm 220 of the C-type frame 200 move back and forth synchronously in the first horizontal direction X.

As shown in FIG. 1, in an embodiment of the present invention, a sliding rail 130 extending in the first horizontal direction X is on one of the first beam 110 of the main frame 100 and the first arm 210 of the C-type frame 200. A sliding block 213 adapted to be mated with the sliding rail 130 is on the other of the first beam 110 of the main frame 100 and the first arm 210 of the C-type frame 200. In this way, through mating the sliding block with the sliding rail 130, the C-type frame 200 may slide back and forth relative to the main frame 100 in the first horizontal direction X.

Figure 2:
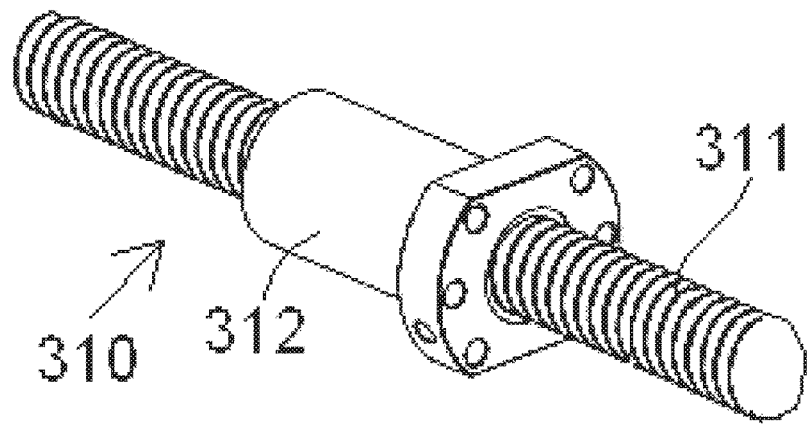
FIG. 2 is a perspective view of a ball screw of a driving mechanism of the online thickness detection platform of FIG. 1.

FIG. 2 is a perspective view of a ball screw 310 of a driving mechanism 300 of the online thickness detection platform of FIG. 1. As shown in FIGS. 1-2, in an embodiment of the present invention, the driving mechanism 300 mainly comprises a ball screw 310 and a drive motor 320 adapted to drive a lead screw 311 of the ball screw 310 to rotate. The drive motor 320 may be directly and coaxially connected to the lead screw 311. The second arm 220 of the C-type frame 200 is connected to a nut 312 of the ball screw 310, so that the C-type frame 200 is driven by the nut 312 of the ball screw 310 to move back and forth in the first horizontal direction X.

As shown in FIGS. 1-2, in an embodiment of the present invention, the ball screw 310 may convert a rotation motion of the drive motor into a linear motion of the C-type frame 200 in the first horizontal direction X. In the illustrated embodiment, in order to realize the reciprocating movement of the C-type frame 200 in the first horizontal direction X, it needs to periodically change the rotation direction of the drive motor.

As shown in FIGS. 1-2, in an embodiment of the present invention, a first adjusting device 410 and a second adjusting device 420 are mounted on the first arm 210 and the second arm 220 of the C-type frame 200, respectively. The first laser sensor 510 and the second laser sensor 520 are mounted on the first adjusting device 410 and the second adjusting device 420, respectively. The first adjusting device 410 and the second adjusting device 420 adjust positions of the first laser sensor 510 and the second laser sensor 520, respectively, so that the first laser sensor 510 and the second laser sensor 520 are aligned to each other in a thickness direction (perpendicular to the first horizontal direction X and the second horizontal direction Y) of the product 10 to be detected.

As shown in FIGS. 1-2, in an embodiment of the present invention, the first adjusting device 410 and the second adjusting device 420 are detachably mounted on the first arm 210 and the second arm 220 of the C-type frame 200, respectively, so that the first/second adjusting device 410/420 and the first/second laser sensor 510/520 mounted thereon are capable of being replaced as a whole. In this way, the first/second laser sensor 510/520 may be easily and conveniently replaced by a new one or any other type of laser sensor.

Referring to FIG. 1 again, in an embodiment of the present invention, the online thickness detection platform further comprises a control cabinet 600 in which electrical components of the online thickness detection platform are installed.

Figure 3:
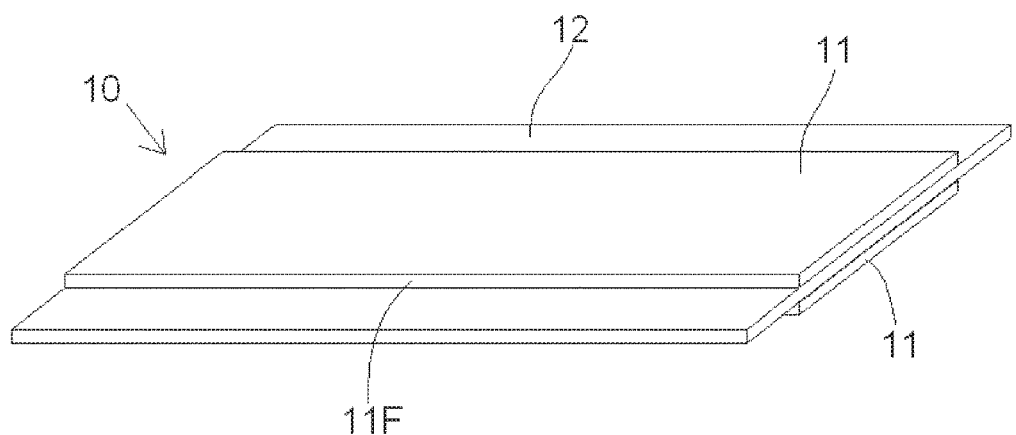
FIG. 3 is a perspective view of a product to be detected by the online thickness detection platform of FIG. 1.

FIG. 3 is a perspective view of the product 10 to be detected by the online thickness detection platform of FIG. 1. As shown in FIG. 3, in an embodiment of the present invention, the product 10 to be detected is a plate member comprising a PTC material layer 12 and two metal layers 11, 11 provided on opposite surfaces of the PTC material layer 12, respectively. The PTC material layer 12 extends beyond both edges of the metal layer 11, so that a width of the PTC material layer 12 is larger than that of the metal layers 11. The online thickness detection platform of FIG. 1 detects the thickness of the product 10 within a surface area of the metal layers 11.

As shown in FIG. 3, the online thickness detection platform only needs to detect the thickness of the product 10 within the surface area of the metal layers 11. Therefore, at the beginning of detecting the thickness of the product 10, detection of a point on a longitudinal edge 11F of the metal layer 11 by the first laser sensor 510 and the second laser sensor 520 is needed first and then this point is used as a starting point of the detection.

Figure 4:
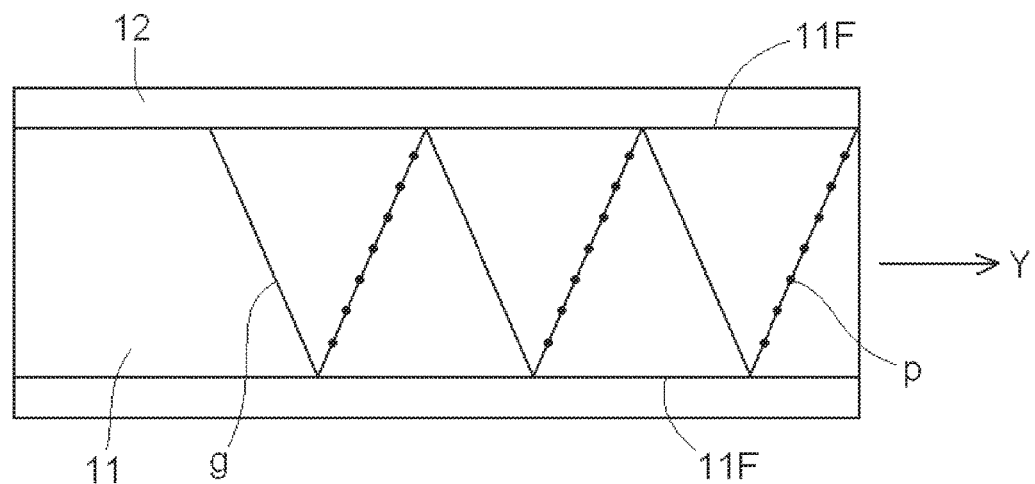
FIG. 4 shows a motion track of a first laser sensor and a second laser sensor, relative to the detected product, of the online thickness detection platform of FIG. 1.

FIG. 4 shows a motion track g of the first laser sensor 510 and the second laser sensor 520, relative to the detected product 10, of the online thickness detection platform of FIG. 1. As shown in FIGS. 1-4, in an embodiment of the present invention, the first laser sensor 510 and the second laser sensor 520 move back and forth between two longitudinal edges 11F of the metal layer 11 during detecting the thickness of the product 10. Therefore, as shown in FIG. 4, the motion track g of the first laser sensor 510 and the second laser sensor 520 relative to the detected product 10 exhibits a zigzag wave line.

As shown in FIG. 4, in an embodiment of the present invention, the first laser sensor 510 and the second laser sensor 520 detect the thickness of the product 10 during moving from one longitudinal edge 11F to the other longitudinal edge 11F of the metal layer 11, but do not detect the thickness of the product 10 during moving from the other longitudinal edge 11F to the one longitudinal edge 11F of the metal layer 11. As shown in FIG. 4, a dot on the motion track g represents a sampling point p for detecting the thickness and the accuracy of the thickness detection may be adjusted by controlling a sampling frequency through adjusting the number of the sampling points p, that is, the accuracy of the thickness detection may be adjusted by controlling the distance between adjacent sampling points.

In an embodiment of the present invention, during movement of the first laser sensor 510 and the second laser sensor 520 from the one longitudinal edge 11F to the other longitudinal edge 11F of the metal layer 11, the online thickness detection platform may determine whether the thickness of the product 10 is qualified according to the thickness detected by the first laser sensor 510 and the second laser sensor 520, that is, the online thickness detection platform may automatically determine whether the detected thickness is within an allowable thickness range, namely, between a predetermined maximum thickness and a predetermined minimum thickness.

It should be noted that the present invention is not limited to the illustrated embodiments. For example, in another embodiment of the present invention, the first laser sensor 510 and the second laser sensor 520 not only detect the thickness of the product 10 during movement from one longitudinal edge 11F to the other longitudinal edge 11F of the metal layer 11, but also detect the thickness of the product 10 during movement from the other longitudinal edge 11F to the one longitudinal edge 11F of the metal layer 11. In this way, accuracy of thickness detection is improved.

In an embodiment of the present invention, the online thickness detection platform may further comprise an alarm device that makes an alarm when the detected thickness of the product 10 is greater than the predetermined maximum thickness or when the detected thickness of the product 10 is less than the predetermined minimum thickness.

In an embodiment of the present invention, the main frame 100 is made of marble. Because a thermal expansion coefficient of marble is small, the main frame 100 made of marble is not easily deformed when temperature changes, thereby improving the accuracy of thickness detection.

In another embodiment of the present invention, the sliding rail 130 and/or the C-type frame 200 may be also made of marble. In this way, the accuracy of thickness detection may be further improved.

Hereinafter, a process of online detecting the thickness of the product in real-time by the online thickness detection platform is described. The process mainly comprises the following steps:

S100: adjusting positions of the first laser sensor 510 and the second laser sensor 520 by the first adjusting device 410 and the second adjusting device 420, so that the first laser sensor 510 and second laser sensor 520 are aligned with each other in the thickness direction of the product 10 to be detected;

S200: setting parameters of the product 10 on production equipment and starting the production equipment to start the production of the product 10;

S300: starting the online thickness detection platform, so that the first laser sensor 510 and second laser sensor 520 begin to move in first horizontal direction X and detecting a point on a longitudinal edge 11F of the metal layer 11 at the beginning of detecting the thickness of the product 10, then this point is used as a starting point of detection;

S400: moving the first laser sensor 510 and second laser sensor 520 from one longitudinal edge (for example, a left longitudinal edge) 11F to the other longitudinal edge (for example, a right longitudinal edge) 11F of the metal layer 11 and detecting the thickness of the product 10;

S500: processing data detected by the first laser sensor 510 and the second laser sensor 520 by a computer and determining whether the detected thickness is within the allowable thickness range;

S600: If the detected thickness is out of the allowable thickness range, the alarm device alarms and the production is stopped; if the detected thickness is within the allowable thickness range, the thickness detection and the production of the product is continued;

S700: moving the first laser sensor 510 and second laser sensor 520 from the other longitudinal edge (for example, the right longitudinal edge) 11F to the one longitudinal edge (for example, the left longitudinal edge) 11F of the metal layer 11 without detecting the thickness of the product 10;

S800: repeating the steps S400 to S700 until the production of the product 10 is completed.

In the above various exemplary embodiments of the present invention, because the thickness of the product may be detected online by the online thickness detection platform, the thickness of the product may be monitored in real-time. Once the thickness of the product is out of an allowed value range, alarm is made and production of the product is stopped in time. This may avoid producing a large number of unqualified products with a thickness out of the allowed value range, thus waste is prevented.

It should be appreciated for those skilled in this art that the above embodiments of the present invention are intended to be illustrative and not restrictive. For example, many modifications may be made to the above embodiments of the present invention by those skilled in this art and various features described in different embodiments may be freely combined with each other without conflicting in configuration or principle.

Although several exemplary embodiments of the present invention have been shown and described, it would be appreciated by those skilled in the art that various changes or modifications may be made in these embodiments without departing from the principles and spirit of the present invention, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An online thickness detection platform, comprising:
   a main frame having a first beam and a second beam:
   (a) extending in a first horizontal direction, and
   (b) opposite to each other in a vertical direction perpendicular to the first horizontal direction;
   a C-type frame slidably mounted on the main frame and having a first arm and a second arm:
   (a) extending in the first horizontal direction, and
   (b) opposite to each other in the vertical direction;
   a first laser sensor and a second laser sensor:
   (a) mounted on the first arm and the second arm of the C-type frame, respectively, and
   (b) detecting a thickness within a surface area of a metal layer of a product that is a plate member comprising a Positive Temperature Coefficient (PTC) material layer and two metal layers provided on opposite surfaces of the PTC wherein the PTC material layer extends beyond both edges of the metal layer, so that a width of the PTC material layer is larger than that of the metal layers:
      (1) passing between the first arm and the second arm of the C-type frame, and
      (2) moving in a second horizontal direction perpendicular to the first horizontal direction, and
   (c) spaced apart and not contacting the product during detecting the thickness of the product; and
   a driving mechanism mounted on the main frame to drive the C-type frame to slide back and forth in the first horizontal direction.

2. The online thickness detection platform according to claim 1, wherein:
   (a) the first arm of the C-type frame is slidably mounted on the first beam of the main frame, and
   (b) the driving mechanism drives the second arm of the C-type frame, so that the first arm and the second arm of the C-type frame move back and forth synchronously in the first horizontal direction.

3. The online thickness detection platform according to claim 2, further including:

(a) a sliding rail extending in the first horizontal direction on one of the first beam of the main frame and the first arm of the C-type frame, and (b) a sliding block mating with the sliding rail on the other of the first beam of the main frame and the first arm of the C-type frame.

4. The online thickness detection platform according to claim 3, wherein:

(a) the driving mechanism comprises:
(1) a ball screw having and lead screw and a nut, and
(2) a drive motor to drive the lead screw of the ball screw to rotate, and (b) the second arm of the C-type frame is connected to the nut of the ball screw, so that the C-type frame is driven by the nut of the ball screw to move back and forth in the first horizontal direction.

5. The online thickness detection platform according to claim 4:

(a) further including a first adjusting device and a second adjusting device mounted on the first arm and the second arm of the C-type frame, respectively, (b) wherein the first laser sensor and the second laser sensor are mounted on the first adjusting device and the second adjusting device, respectively, and (c) wherein the first adjusting device and the second adjusting device adjust positions of the first laser sensor and the second laser sensor, respectively, so that the first laser sensor and the second laser sensor are aligned to each other in a thickness direction of the product to be detected.

6. The online thickness detection platform according to claim 5, wherein the first adjusting device and the second adjusting device are detachably mounted on the first arm and the second arm of the C-type frame, respectively, so that the first and second adjusting devices and the first and second laser sensors mounted thereon are capable of being replaced as a whole.

7. The online thickness detection platform according to claim 6, further comprising a control cabinet in which electrical components of the online thickness detection platform are installed.

8. The online thickness detection platform according to claim 1, wherein the first laser sensor and the second laser sensor detect a point on a longitudinal edge of the metal layer at the beginning of detecting the thickness of the product which is used as a starting point of detection.

9. The online thickness detection platform according to claim 8, wherein the first laser sensor and the second laser sensor move back and forth between two longitudinal edges of the metal layer during detecting the thickness of the product.

10. The online thickness detection platform according to claim 9, wherein the first laser sensor and the second laser sensor detect the thickness of the product during moving from one longitudinal edge to the other longitudinal edge of the metal layer without detecting the thickness of the product during moving from the other longitudinal edge to the one longitudinal edge of the metal layer.

11. The online thickness detection platform according to claim 9, wherein the first laser sensor and the second laser sensor detect the thickness of the product during moving back and forth between the two longitudinal edges of the metal layer.

12. The online thickness detection platform according to claim 10, further comprising an alarm device that makes an alarm when the detected thickness of the product is greater than a predetermined maximum thickness or when the detected thickness of the product is less than a predetermined minimum thickness.

13. The online thickness detection platform according to claim 1, wherein the main frame is made of marble.

* * * * *